J. KING, Jr.
Bent Lever Scales.
No. 55,117.
Patented May 29, 1866.
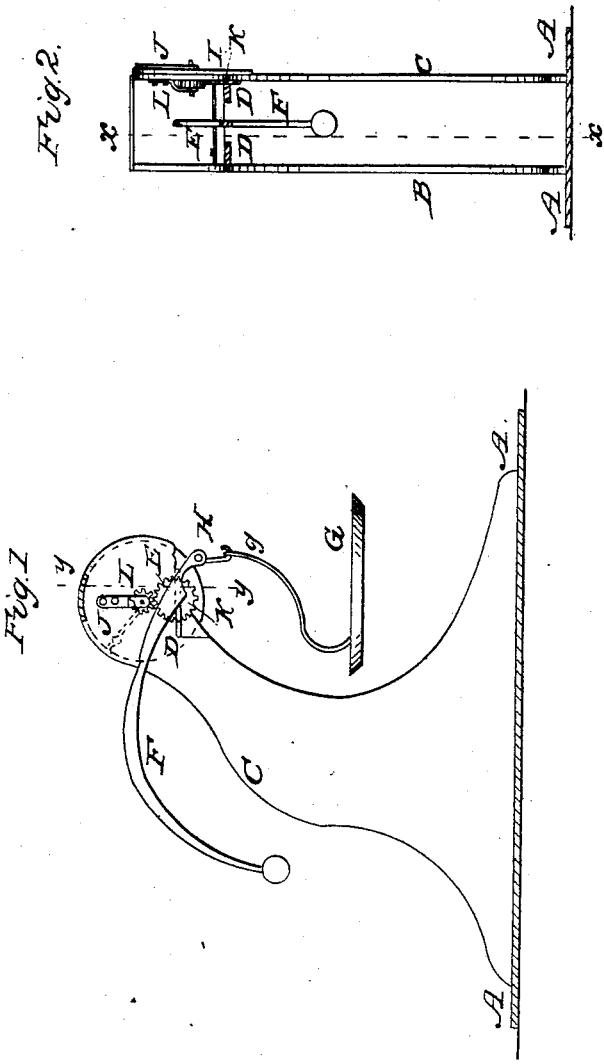
Witnesses
Inventor

UNITED STATES PATENT OFFICE.

JACOB KING, JR., OF FORT WAYNE, INDIANA.

IMPROVEMENT IN BENT-LEVER SCALES.

Specification forming part of Letters Patent No. 55,117, dated May 29, 1866.

*To all whom it may concern:*

Be it known that I, JACOB KING, Jr., of Fort Wayne, Allen county, State of Indiana, have invented a new and useful Improvement in Lever Weighing-Scales; and I do hereby declare that the following is a full, clear, and exact description thereof, which will enable others skilled in the art to make and use the same, reference being had to the accompanying drawings, forming part of this specification, in which—

Figure 1 is a vertical section of my improved lever-scales, taken through the line $x\ x$, Fig. 2. Fig. 2 is a front view of the same, partly in section, through the line $y\ y$, Fig. 1.

Similar letters of reference indicate like parts.

My invention has for its object to furnish an improved lever weighing-scales which shall be cheap, simple, convenient, and accurate; and it consists of a weighing-scale formed by combining the lever F, scale-pan G, cog-wheels K L, and index J with each other and with the frame of the scales, as hereinafter more fully described.

A is the foundation of the scales, which should be broad enough to support the instrument securely. Upon this foundation, and firmly attached to it, are two side pieces, B and C. The form of these side pieces is not material; but the one represented in the drawings is the form which I prefer and which I recommend. To the inner sides of these supports, near their upper ends, are attached supports D. Upon the upper sides of these supports D are formed sockets for the reception of the knife-edge E, by means of which the lever F is pivoted to said supports.

The lever F is made in the form represented in Fig. 1, and having its lower end so weighted as to balance the scale-pan, bringing the index J to the zero-mark on the scale I.

The scale-pan is supported by hanging its bail $g$ upon a hook, H, which hook is pivoted to the short arm of the lever by a knife-edge pivoting-pin, as shown in Fig. 1.

To one end of the knife-edge pivoting-pin E is attached a small cog-wheel, K, which meshes into the small cog-wheel L. The shaft of the cog-wheel L extends through the standard C and carries upon its end the index or pointer J, as shown in Fig. 2.

By having weights to attach to the lower end of the lever F the scales may be made to weigh articles of greater weight.

The scale-pan G may be replaced by a platform supported and properly balanced above the end of the lever, if so desired.

By extending the shaft of the cog-wheel L across the machine an index and scale may be formed on both sides of the scales, which may be a convenience in some situations.

I claim as new and desire to secure by Letters Patent—

An improved lever weighing-scales formed by combining the lever F, scale-pan G, cog-wheels K and L, and index J with each other and with the frame of the scales, substantially as herein described, and for the purpose set forth.

JACOB KING, JR.

Witnesses:
BERNARD WAGNER,
EDWARD COLSON.